(12) United States Patent
Yang et al.

(10) Patent No.: US 6,873,657 B2
(45) Date of Patent: Mar. 29, 2005

(54) METHOD OF AND SYSTEM FOR IMPROVING TEMPORAL CONSISTENCY IN SHARPNESS ENHANCEMENT FOR A VIDEO SIGNAL

(75) Inventors: Yibin Yang, Pine Brook, NJ (US); Lilla Boroczky, Mount Kisco, NY (US); Johan Janssen, Asten (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 607 days.

(21) Appl. No.: 10/029,823

(22) Filed: Dec. 27, 2001

(65) Prior Publication Data

US 2003/0123549 A1 Jul. 3, 2003

(51) Int. Cl.$^7$ .................................................. H04N 7/12
(52) U.S. Cl. .................................. 375/240.16; 382/263
(58) Field of Search ........................ 375/240.16, 240.04; 382/167, 263; 348/28, 625, 807

(56) References Cited

U.S. PATENT DOCUMENTS

| | | | |
|---|---|---|---|
| 5,737,027 A | * 4/1998 | Demos | ........................ 348/474 |
| 5,835,375 A | 11/1998 | Kitamura | |
| 6,023,295 A | 2/2000 | Pau | |
| 6,034,742 A | 3/2000 | Kimoto et al. | |
| 6,078,686 A | * 6/2000 | Kim | ........................... 382/167 |
| 6,239,561 B1 | 5/2001 | Allender | |
| 6,259,472 B1 | * 7/2001 | Park | ........................... 348/28 |
| 6,278,736 B1 | 8/2001 | De Haan et al. | |

FOREIGN PATENT DOCUMENTS

| WO | WO0042778 | 7/2000 | .......... H04N/5/028 |
|---|---|---|---|
| WO | WO0145389 | 6/2001 | .......... H04N/5/208 |

OTHER PUBLICATIONS

Olukayode A. Ojo and TatianaG. Kwaaital–Spassova, An Algorithm for Integrated Noise Reduction and Sharpness Enhancement, Aug. 3, 2000, IEEE Transaction on Consumer Electronics, vol. 46, No. 3, Aug. 2002, pp. 474–480.*

C–J Tsai, P. Karunaratne, N.P. Galatsanos and A.K. Katsaggelos, "A Compressed Video Enhancement Algorithm", Proc. of IEEE, ICIF'99, Kobe, Japan, Oct. 25–28, 1999.

B. Martins and S. Forchamer, "Improved Decoding of MPEG–2 Coded Video", Proc. of IBC'2000, Amsterdam, The Netherlands, Sept. 7–12, 2000, pp. 109–115.

* cited by examiner

*Primary Examiner*—Gims Philippe
(74) *Attorney, Agent, or Firm*—John Vodopia

(57) ABSTRACT

In accordance with the preferred embodiment of the present invention, a method of and system for improving temporal consistency of an enhanced signal representative of at least one frame using a sharpness enhancement algorithm with an enhancement gain are provided. The method comprises the steps of: receiving the enhanced signal comprising at least one frame, obtaining an enhancement gain for each pixel in the frame, retrieving an enhancement gain value of each pixel in a reference frame from a gain memory using motion vectors, identifying if the frame is an I, P or B frame type and determining an updated enhancement gain for an I frame type by calculating a gain map for use in the sharpness enhancement algorithm. The updated enhancement gain of each pixel is equal to enhancement gain previously determined for use in the sharpness enhancement algorithm. In addition, the method includes storing the updated enhancement gain to gain memory, and applying the updated enhancement gain to the sharpness enhancement algorithm to improve temporal consistency of the enhanced signal. The method may further comprise the step of further improving the updated enhancement gain by applying a motion adaptive temporal IIR filter on the updated enhancement gain.

13 Claims, 2 Drawing Sheets

METHOD OF AND SYSTEM FOR IMPROVING TEMPORAL CONSISTENCY IN SHARPNESS ENHANCEMENT FOR A VIDEO SIGNAL

BACKGROUND OF THE INVENTION

1. Field of the Invention

The present invention is directed to a system and method for enhancing the quality of a digital video signal. In particular, the system and method of the invention improves temporal consistency in a sharpness enhancement algorithm.

2. Description of the Related Art

The development of high-quality multi-media devices, such as set-top boxes, high-end TV's, Digital TV's, Personal TV's, storage products, PDA's, wireless internet devices, etc., is leading to a variety of architectures and to more openness towards new features for these devices. Moreover, the development of these new products and their ability to display video data in any format, has resulted in new requirements and opportunities with respect to video processing and video enhancement algorithms.

MPEG (Moving Picture Expert Group) video compression is used in many current and emerging products. MPEG is at the heart of digital television set-top boxes, DSS, HDTV decoders, DVD players, video conferencing, Internet video, and other applications. These applications benefit from video compression by requiring less storage space for archived video information, less bandwidth for the transmission of the video information from one point to another, or a combination of both. Most of these devices receive and/or store video in the MPEG-2 format. In the future they may receive and/or store video in the MPEG-4 format. The picture quality of these MPEG sources can vary greatly.

Research into human visual system has shown that the eye is more sensitive to changes in luminance, and less sensitive to variations in chrominance. MPEG operates on a color space that effectively takes advantage of the eye's different sensitivity to luminance and chrominance information. Thus, MPEG uses a YCbCr color space to represent the data values instead of RGB; where Y is the luminance component, experimentally determined to be Y=0.299R+0.587G+0.114B, Cb is the blue color difference component, where Cb=B−Y, and Cr is the red color difference component, where Cr=R−Y.

MPEG video is arranged into a hierarchy of layers to help with error handling, random search and editing, and synchronization, for example with an audio bit-stream. The first layer, or top layer, is known as the video sequence layer, and is any self-contained bitstream, for example a coded movie, advertisement or a cartoon.

The second layer, below the first layer, is the group of pictures (GOP), which is composed of one or more groups of intra (I) frames and/or non-intra (P and/or B) pictures. I frames are strictly intra compressed. Their purpose is to provide random access points to the video. P frames are motion-compensated forward-predictive-coded frames. They are inter-frame compressed, and typically provide more compression than I frames. B frames are motion-compensated bidirectionally-predictive-coded frames. They are inter-frame compressed, and typically provide the most compression.

The third layer, below the second layer, is the picture layer itself. The fourth layer beneath the third layer is called the slice layer. Each slice is a contiguous sequence of raster ordered macroblocks, most often on a row basis in typical video applications. The slice structure is intended to allow decoding in the presence of errors. Each slice consists of macroblocks, which are 16×16 arrays of luminance pixels, or picture data elements, with two 8×8 arrays (depending on format) of associated chrominance pixels. The macroblocks can be further divided into distinct 8×8 blocks, for further processing such as transform coding. A macroblock can be represented in several different manners when referring to the YCbCr color space. The three formats commonly used are known as 4:4:4, 4:2:2 and 4:2:0 video. 4:2:2 contains half as much chrominance information as 4:4:4, which is a full bandwidth YCbCr video, and 4:2:0 contains one quarter of the chrominance information. Because of the efficient manner of luminance and chrominance representation, the 4:2:0 representation allows immediate data reduction from 12 blocks/macroblock to 6 blocks/macroblock.

I frames provide only moderate compression as compared to the P and B frames, where MPEG derives its maximum compression efficiency. The efficiency is achieved through a technique called motion compensation based prediction, which exploits temporal redundancy. Since frames are closely related, it is assumed that a current picture can be modeled as a translation of the picture at the previous time. It is possible then to accurately predict the data of one frame based on the data of a previous frame. In P frames, each 16×16 sized macroblock is predicted from the macroblocks of previously encoded I or P picture. Since frames are snapshots in time of a moving object, the macroblocks in the two frames may not correspond to the same spatial location. The encoder would search the previous frame (for P-frames, or the frames before and after for B-frames) in half pixel increments for other macroblock locations that are a close match to the information that is contained in the current macroblock. The displacements in the horizontal and vertical directions of the best match macroblocks from a cosited macroblock are called motion vectors. The difference between the current block and the matching block and the motion vector are encoded. The motion vectors can also be used for motion prediction in case of corrupted data, and sophisticated decoder algorithms can use these vectors for error concealment. For B frames, motion compensation based prediction and interpolation is performed using reference frames present on either side of each frame.

Next generation storage devices, such as the blue-laser-based Digital Video Recorder (DVR) will have to some extent HD (High Definition) (ATSC) capability and are an example of the type of device for which a new method of picture enhancement would be advantageous. An HD program is typically broadcast at 20 Mb/s and encoded according to the MPEG-2 video standard. Taking into account the approximately 25 Gb storage capacity of the DVR, this represents about a two-hour recording time of HD video per disc. To increase the record time, several long-play modes can be defined, such as Long-Play (LP) and Extended-Long-Play (ELP) modes.

For LP-mode the average storage bitrate is assumed to be approximately 10 Mb/s, which allows double record time for HD. As a consequence, transcoding is an integral part of the video processing chain, which reduces the broadcast bitrate of 20 Mb/s to the storage bitrate of 10 Mb/s. During the MPEG-2 transcoding, the picture quality (e.g., sharpness) of the video, is most likely reduced. However, especially for the LP mode, the picture quality should not be compromised too much. Therefore, for the LP mode, post-processing plays an important role in improving the perceived picture quality.

To date, most of the state-of-the-art sharpness enhancement algorithms were developed and optimized for analog video transmission standards like NTSC (National Television System Committee), PAL (Phase Alternation Line) and SECAM (SEquential Couleur A Memoire). Traditionally, image enhancement algorithms either reduce certain unwanted aspects in a picture (e.g., noise reduction) or improve certain desired characteristics of an image (e.g., sharpness enhancement). For these emerging storage devices, the traditional sharpness enhancement algorithms may perform sub-optimally on MPEG encoded or transcoded video due to the different characteristics of these sources.

Because picture quality will remain a distinguishing factor for high-end video products, new approaches for performing image enhancement, specifically adapted for use with these sources, will be beneficial. In C-J Tsai, P. Karunaratne, N. P. Galatsanos and A. K. Katsaggelos, "A Compressed Video Enhancement Algorithm", *Proc. of IEEE,* ICIP'99, Kobe, Japan, Oct. 25–28, 1999, the authors propose an iterative algorithm for enhancing video sequences that are encoded at low bit rates. For MPEG sources, the degradation of the picture quality originates mostly from the quantization function. Thus, the iterative gradient-projection algorithm employed by the authors uses coding information such as quantization step size, macroblock types and forward motion vectors in its cost function. The algorithm shows promising results for low bit rate video, however, the method is marked by high computational complexity.

In B. Martins and S. Forchammer, "Improved Decoding of MPEG-2 Coded Video", *Proc. of IBC'*2000, Amsterdam, The Netherlands, Sep. 7–12, 2000, pp. 109–115, the authors describe a new concept for improving the decoding of MPEG-2 coded video. Specifically, a unified approach for deinterlacing and format conversion, integrated in the decoding process, is proposed. The technique results in considerably higher picture quality than that obtained by ordinary decoding. However, to date, its computational complexity prevents its implementation in consumer applications.

Both papers describe video enhancement algorithms using MPEG coding information and a cost function. However, both of these scenarios, in addition to being impractical, combine the enhancement and the cost function. A cost function determines how much, and at which locations in a picture, enhancement can be applied. The problem which results from this combination of cost and enhancement functions is that only one algorithm can be used with the cost function.

Moreover, previous attempts to improve the sharpness enhancement algorithms did not differentiate between different picture types, such as I, P and B frames. The result may be a temporally inconsistent sharpness enhancement.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

It is therefore an object of the present invention to provide a system for and method of improving temporal consistency of a video signal in a sharpness enhancement algorithm.

To achieve these and other advantages and in accordance with the purpose of the invention, as embodied and broadly described, the invention includes a method of improving temporal consistency of an enhanced signal representative of at least one frame using a sharpness enhancement algorithm with an enhancement gain. The method comprises the steps of: receiving the enhanced signal including at least one frame, obtaining an enhancement gain associated with the sharpness enhancement algorithm for each pixel in the frame and determining an updated enhancement gain for the enhancement gain of each pixel in the frame. The method further includes the steps of storing the updated enhancement gain to gain memory, and applying the updated enhancement gain to the sharpness enhancement algorithm to improve temporal consistency of the enhanced signal.

The system comprises a filter for filtering the video signal and generating a high pass signal, a multiplier for multiplying the high pass signal by an updated enhancement gain generated through the method of the present invention and generating a gain controlled signal, and an adder for adding the video signal with the gain controlled signal, the adder generating an enhanced temporally consistent video signal.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Reference will now be made in detail to the present preferred embodiments of the invention, an example of which is illustrated in the accompanying drawings. The method and corresponding steps of the invention will be described in conjunction with the detailed description of the system.

Figure 1:
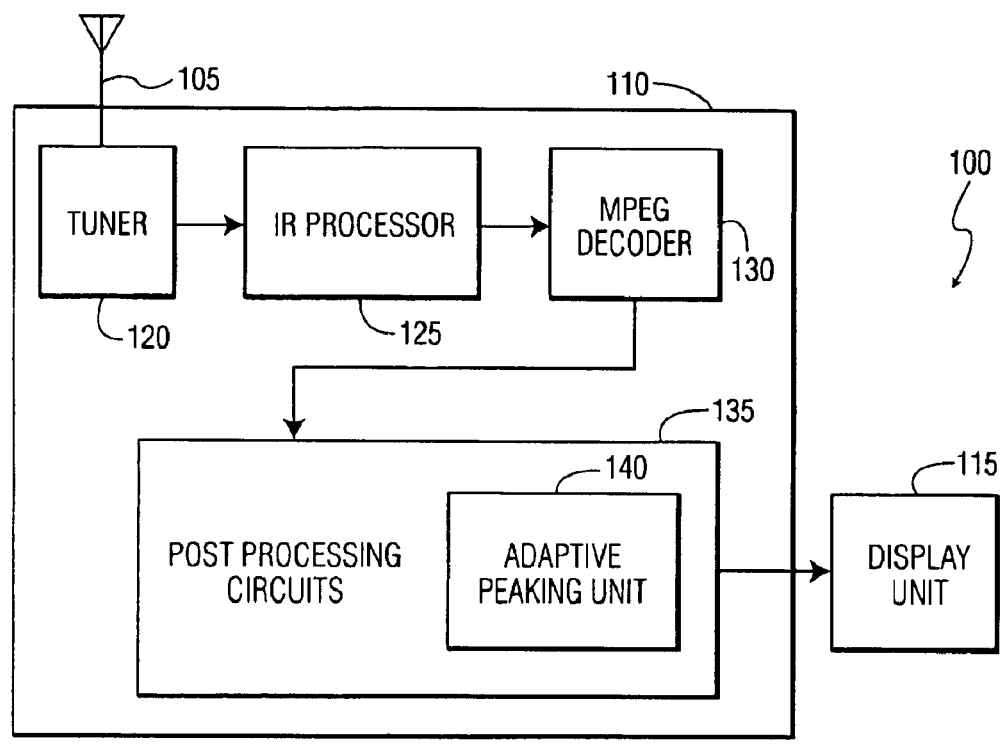
FIG. 1 is a block diagram of an exemplary digital television set comprising the system and method of the present invention.
Figure 2:
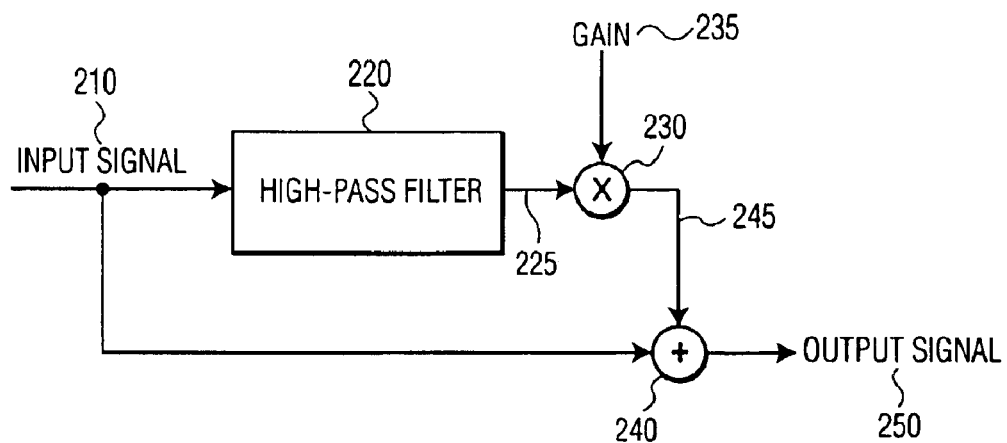
FIG. 2 is a block diagram illustrating a sharpness enhancement algorithm used in accordance with the present invention.
Figure 3:
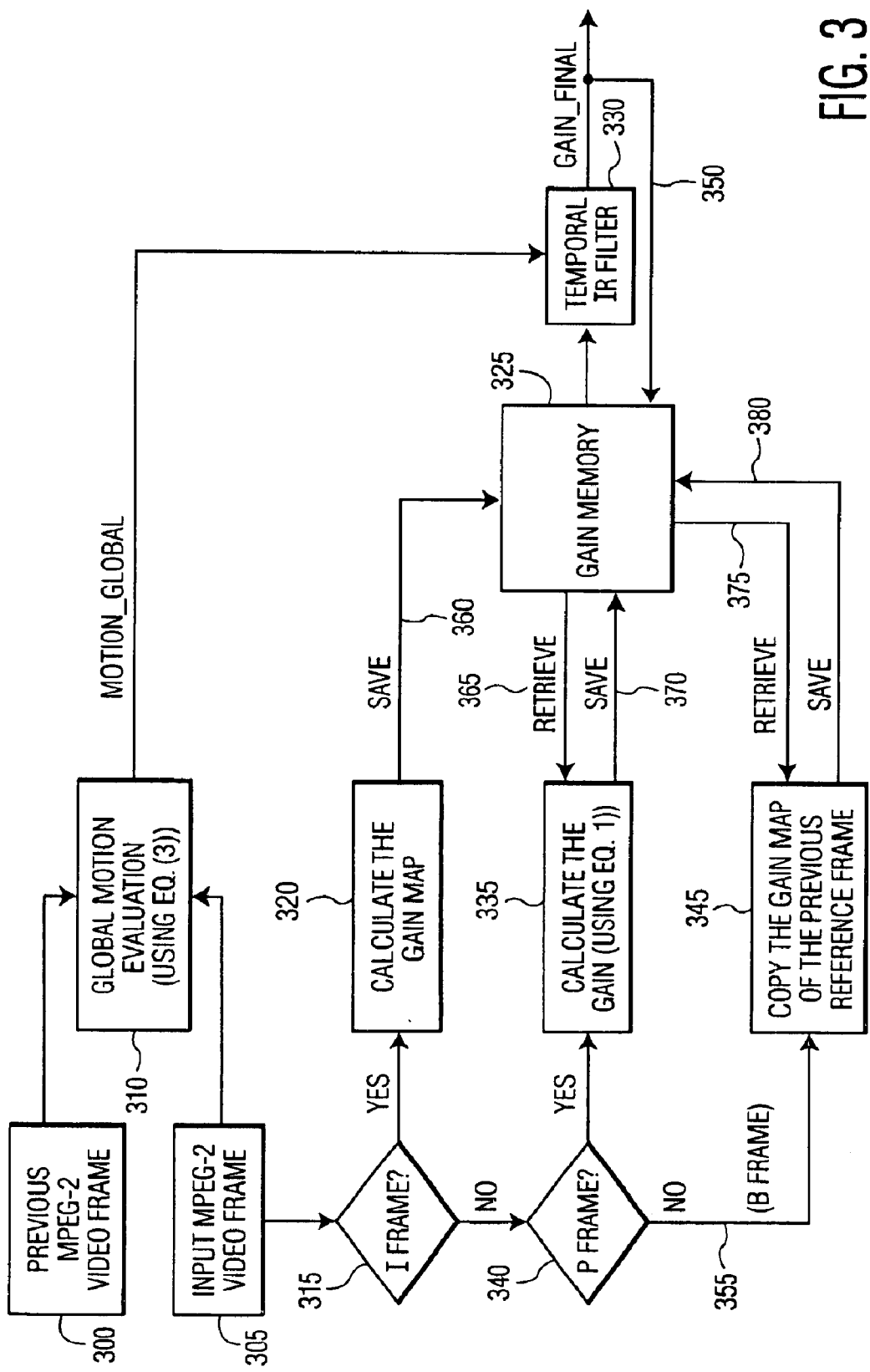
FIG. 3 is a flow diagram illustrating an advantageous embodiment of a method of operation of the present invention.

FIGS. 1 through 3, discussed below, and the various embodiments herein to describe the principles of the system and method of the present invention, are by way of illustration only and should not be construed in any way to limit the scope of the invention. The system and method of the present invention will be described as a system for and method of enhancing image quality of a coded digital video signal in a digital television set. It is important to realize that the system and method of the present invention is not limited to digital television sets. Those skilled in the art will readily understand that the principles of the present invention may also be successfully applied in any type of digital video system, including, without limitation, television receivers, set top boxes, storage devices, computer video display systems, and any type of electronic equipment that utilizes or processes digital video signals. The term "digital video system" is used to refer to these and other similar types of equipment available now or in the future. In the descriptions that follow, a digital television set is employed as one representative illustration of a digital video system.

FIG. 1 is a block diagram of a digital television set 100 that utilizes the apparatus and method of the present invention. Digital television set 100 comprises television receiver 110 and display unit 115. Display unit 115 may be a cathode ray tube or a flat panel display or any type of equipment for displaying video images. Television receiver 110 comprises antenna 105 for receiving television signals. Antenna 105 is coupled to tuner 120. Tuner 120 is coupled to intermediate frequency ("IF") processor 125. IF processor 125, as embodied herein, is coupled to a decoder 130. While the present invention depicts an MPEG decoder, the invention is not limited to MPEG type encoding/decoding. According to other embodiments of the present invention, any block based compression schemes, such as, for example, JPEG (still image compression standard), MPEG-1,2,4 (digital video standards), H.261, H. 263 (video conferencing standards) and others can be utilized. In these standards, a two-dimensional (2D) DCT (Discrete Cosine Transform) is applied to 8 by 8 blocks of pixels in the image that is compressed.

Alternatively, according to another embodiment of the present invention, the video signal received from the IF processor does not have to be encoded, and therefore, there is no need for an MPEG decoder.

The output of MPEG decoder 130 is coupled to post-processing circuits 135. Post processing circuits 135 may comprise an adaptive peaking unit 140. Adaptive peaking unit 140 may be located at an appropriate location within the post-processing circuits 135. The output of post-processing circuits 135 is input to display unit 115.

As embodied herein, adaptive peaking unit 140 processes the video signals received from MPEG decoder 130. Adaptive peaking unit 140 generates a value of a gain for use in the adaptive peaking process, such as a sharpness enhancement algorithm. It is understood that the system and method of the present invention is not limited to the process of adaptive peaking. The present invention may be used with more than one type of video enhancement algorithm.

The output of adaptive peaking unit 140 is an enhanced luminance signal for the video signals that adaptive peaking unit 140 receives from MPEG decoder 130. The luminance signal determined by adaptive peaking unit 140 provides a more accurate, visually distinct and temporally consistent video image than that provided by prior art adaptive peaking units. Adaptive peaking unit 140 transfers the enhanced luminance signal to other circuits within post processing circuits 135. Post-processing circuits 135 are capable of utilizing the enhanced luminance signal to enhance the quality of video signals.

Post-processing circuits 135 are capable of carrying out several different types of video signal processing. For example, some of the video signal processing applications include (a) noise level adaptive noise reduction algorithms, (b) noise level adaptive sharpness enhancement, (c) noise level adaptive luminance-chrominance separation, (d) noise level adaptive motion detection, (e) noise level adaptive motion estimation and compensation, (f) noise level adaptive up-conversion, (g) noise level adaptive feature enhancement, and (h) noise level adaptive object based algorithms.

FIG. 2 is a block diagram illustrating the system and method of adaptive peaking unit 140 according to one advantageous embodiment of the present invention. FIG. 2 illustrates how the gain, computed according to the methods of the present invention, can be applied to an adaptive peaking algorithm for sharpness enhancement. The adaptive peaking algorithm is directed at increasing the amplitude of the transient of an input luminance signal 210.

The above described system uses an adaptive peaking algorithm for sharpness enhancement. Alternatively, the sharpness enhancement algorithm adopted for the present invention could be a spatial-domain algorithm, for example, or other known algorithmic techniques.

The present invention takes into account motion information of the video signal to calculate an enhancement gain to be used with the sharpness enhancement algorithm. Motion vectors are used to obtain information on the temporal characteristics of the video to be enhanced. Motion vectors present in the MPEG bitstream or motion vectors from other motion estimation methods can be used as well.

An adaptive peaking sharpness enhancement algorithm illustrated in FIG. 2 shows the input luminance signal 210 first passing through a peaking filter 220 which is typically a high-pass filter. The high-pass filtered signal is then multiplied by an enhancement gain indicative of the allowable amount of peaking.

FIG. 2 also illustrates the system for improving consistency of a video signal in accordance with the present invention. The system comprises a high-pass filter 220 for filtering the input video signal 210, a multiplier 230 for multiplying the high pass filtered signal 225 by the updated enhancement gain 235 determined through any of the methods of the present invention. The multiplication generates a gain controlled signal 245. The system further includes an adder 240 for adding the input video signal 210 with the gain controlled signal 245 and generating an output video signal 250 which improves the sharpness as compared to the input signal. In addition, the temporal consistency of the enhanced output signal is improved relative to the prior art output signal generated by the sharpness enhancement algorithm.

In accordance with the preferred embodiment of the present invention, a method of improving temporal consistency of an enhanced signal representative of at least one frame using a sharpness enhancement algorithm with an enhancement gain is provided. The method comprises the steps of receiving the enhanced signal including at least one frame, obtaining an enhancement gain associated with the sharpness enhancement algorithm for each pixel in the frame and determining an updated enhancement gain for the enhancement gain of each pixel in the frame.

According to a preferred embodiment of the present invention, the updated enhancement gain of a pixel within a frame is computed according to the following equation:

$$\text{gain\_update} = \alpha * \text{gain}SEA + (1-\alpha) * \text{gain}REF \qquad \text{Equation (1)}$$

wherein gain_update is the updated enhancement gain to use in the sharpness enhancement algorithm, gainSEA is the enhancement gain previously defined in said sharpness enhancement algorithm, gainREF is the gain value of a reference pixel pointed by a motion vector in the reference frame, and $\alpha$ is a coefficient in the range between 0 and 1 ($0 \leq \alpha \leq 1$).

Equation 1 takes into account two values: the original gain previously computed for or otherwise associated with the same pixel within the particular frame in question for the sharpness enhancement algorithm (gainSEA) and the gain value of a pixel within a reference frame from which the motion vector is computed (gain_REF). If alpha ($\alpha$) is 0, gain_update is equal to gainREF, and if alpha(α) is 1, gain_update is equal to gainSEA. The gainSEA is the enhancement gain of a pixel which has been typically used with a prior art sharpness enhancement algorithm, i.e. it is the gain which is to be improved according to the preferred embodiment of the present invention.

According to the preferred embodiment of the present invention, the method further includes the step of storing the updated enhancement gain to gain memory and applying the updated enhancement gain to the sharpness enhancement algorithm to improve temporal consistency of the enhanced signal.

Abrupt frame-to-frame changes in the gain for any given pixel can result in temporally inconsistent sharpness enhancement, which is undesirable. Such changes can also intensify temporally visible and annoying artifacts such as mosquito noise.

To remedy this effect, according to an additional aspect of the present invention, the temporal consistency of the video signal in a sharpness enhancement algorithm can be improved by using a motion adaptive temporal infinite impulse response (IIR) filter on the gain map. In a preferred embodiment, one possible IIR filter can be defined according to the following equation:

$$\text{gain\_final} = K^* \text{gainSEA} + (1-K)^* \text{gain\_prev} \quad \text{Equation (2)}$$

wherein gain_final is the improved enhancement gain to use in the sharpness enhancement algorithm, gainSEA is the gain previously defined for the sharpness enhancement algorithm, gain_prev is a gain value of a pixel at the same location in the previous frame, and K is a factor calculated based on global motion evaluation.

Global Motion is evaluated as follows. First, an absolute value of the difference between the current frame and the previous frame is calculated pixel by pixel. Then, the absolute value is compared with a fixed predetermined threshold. Next, the number of absolute values which are larger than the threshold is counted. As a result, global motion is defined according to the equation:

$$\text{motion\_global} = \text{count\_over}/\text{count\_num} \quad \text{Equation (3)}$$

wherein count_num is the total number of the differences calculated, count_over is the number of absolute values larger than the predetermined threshold, and motion_global is the K factor to be used in Equation 2. According to the preferred embodiment of the present invention, to reduce the computational complexity the pixel-by-pixel difference between the current frame and the previous frame can be calculated in every fourth line of a frame or some other desired number of lines.

According to another aspect of the present invention, the IIR filter can be applied in combination with the enhancement gain method according to Equation 1, as opposed to being applied separately to a video signal.

According to an additional aspect of the present invention, the enhancement gain can be calculated by differentiating between different types of pictures, such as I, P and B frames in MPEG encoded sequence. The I (or intra coded) frames use DCT encoding only to compress a single frame without reference to any other frame in the sequence. P (or predicted) frames are coded as differences from the last I or P frame. The new P-frame is first predicted by taking the last I or P frame and predicting the values of each new pixel. As a result P-frames typically provide a compression ratio better than I-frames. B (or bi-directional) frames are coded as differences from the last or next I or P frame. B-frames use prediction similar to P-frames, but for each block either or both, the previous I or P frame is used or the next I or P frame is used. Both P and B frames use motion prediction and DCT encoding, however, B-frames typically have an improved compression compared with P-frames, because it is possible to choose for every macroblock whether the previous or next frame is taken for comparison.

For purposes of example and not limitation, FIG. 3 illustrates these additional combined aspects of the present invention.

For example, and as embodied herein, the method may comprise the step of identifying if the frame is an I frame and calculating a gain map for use in the sharpness enhancement algorithm, wherein the updated enhancement gain of each pixel is equal to enhancement gain previously determined for use in the sharpness enhancement algorithm if the frame is I-frame type.

Similarly, and as further embodied herein, the method further comprises the steps of identifying if the frame is P-frame or B-frame type, retrieving an enhancement gain value of each pixel in a reference frame from the gain memory using motion vectors and calculating the updated enhancement gain according to Equation 1.

After decoding a video signal representative of a set of I, P and B frames is received and global motion is evaluated according to the Equation 3 based on a current input video frame and a previous video frame. The result of global motion evaluation is applied to the motion adaptive IIR filter. In parallel with the global motion evaluation, the updated enhancement gain of the input video frame is computed based on the frame type. If the input video frame is an I-frame, the gain map (gain of each pixel in a frame) for the frame is computed in accordance with prior art and stored into gain memory. Gain calculation of each pixel within a frame is well known to those skilled in the art. If the input video frame is a P or a B frame, the updated enhancement gain values for this frame are computed using Equation 1 and then stored into memory. Since Equation 1 uses gain values of the reference frame and the previous frame, the necessary gain values are retrieved from the gain memory. Alternatively, instead of using Equation 1, if the input video frame is a B-frame, the updated enhancement gain values can be computed by simply copying the gain map of the previous reference frame (by retrieving the gain values from gain memory) and storing the values into gain memory. For intra-blocks (I-frames), the motion vector value used is zero (0), but for B-frames, as noted above, the gain map of the previous reference frame can be used. According to one aspect of the present invention, the same method of calculating the updated enhancement gain can be used for B and P frames.

Following the calculation of the updated enhancement gains for each frame, and as previously noted, the video signal can be further improved by applying the temporal adaptive IIR filter as described above, thereby further modifying the updated enhancement gains. The final improved gain values are then stored back into the gain memory.

The determination of the original enhancement gain (gainSEA) is well known in art, and those skilled in the art can design their own formulas to calculate the gain. The present invention can be used to modify that original enhancement gain to achieve temporally consistent sharpness enhancement.

The invention can also be applied to high definition (HD) and standard definition (SD) sequences such as would be present in a video storage application having high definition (HD) capabilities and allowing long play (LP) mode. The majority of such video sequences are transcoded to a lower storage bitrate from broadcast MPEG-2 bitstreams. For the long play (LP) mode of this application, format change can also take place during transcoding. Standard definition (SD) or high definition (HD) video sequences are encoded, decoded, and then processed with the sharpness enhancement algorithm, according to the present invention, to provide superior video quality.

The result of the sharpness enhancement algorithm, as illustrated in FIG. 2 is the following:

$$\text{out\_pixel} = \text{input\_pixel} + \text{mpeg\_gain} * \text{convolution\_result}, \quad \text{Equation (4)}$$

wherein output_pixel is the final luminance value to be used for the pixel, input_pixel is the luminance value of the input pixel, mpeg_gain is the enhancement gain computed through any of the above methods (i.e. either an updated enhancement gain or an improved enhancement gain), and convolution_result is the high-pass filter output.

The method and system of the present invention, as described above and shown in the drawings, provide for an improved way to enhance the quality of a digital video signal, by utilizing a sharpness enhancement algorithm. In particular, temporal consistency in a sharpness enhancement algorithm is achieved.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method of improving temporal consistency of an enhanced signal representative of at least one frame using a sharpness enhancement algorithm with an enhancement gain, said method comprising the steps of:

receiving the enhanced signal including at least one frame;

obtaining an enhancement gain associated with the sharpness enhancement algorithm for each pixel in the frame;

determining an updated enhancement gain for the enhancement gain of each pixel in said frame;

storing said updated enhancement gain to gain memory; and applying the updated enhancement gain to said sharpness enhancement algorithm to improve temporal consistency of said enhanced signal.

2. The method of claim 1, further comprising the step of identifying if the frame is an I frame; and the determining step including the step of calculating a gain map for use in the sharpness enhancement algorithm, wherein the updated enhancement gain of each pixel is equal to the enhancement gain previously obtained for use in the sharpness enhancement algorithm if the frame is I-frame type.

3. The method of claim 1, further comprising the steps of identifying if the frame is P-frame type or B-frame type; and, if the frame is P-frame type or B-frame type, retrieving an enhancement gain value of each pixel from a reference frame in the gain memory based on motion vectors;

wherein the determining step includes calculating updated enhancement gain according to the equation:

$$\text{gain\_update} = \alpha * \text{gainSEA} + (1-\alpha) * \text{gainREF}$$

wherein gain_update is the updated enhancement gain to use in said sharpness enhancement algorithm, gainSEA is the enhancement gain previously defined in said sharpness enhancement algorithm, gainREF is the enhancement gain value of a reference pixel pointed by a motion vector in said reference frame, and α is a coefficient in the range between 0 and 1.

4. The method of claim 1, further comprising the step of identifying if the frame is B-frame type; and the determining step including the step of calculating a gain map for use in the sharpness enhancement algorithm, wherein the updated enhancement gain of each pixel is equal to the enhancement gain from a previous reference frame if the frame is B-frame type.

5. The method of claim 1, further comprising the step of calculating an improved enhancement gain of a pixel in a frame by applying a motion adaptive temporal IIR filter on said updated enhancement gain stored in said gain memory, said improved enhancement gain is determined by the equation:

$$\text{gain\_final} = K * \text{gain\_update} + (1-K) * \text{gain\_prev},$$

wherein gain_final is the improved enhancement gain to use in said sharpness enhancement algorithm, gain_update is the updated enhancement gain previously stored in said gain memory, gain_prev is the enhancement gain of a pixel at the same location in the previous frame, and K is a factor calculated based on global motion evaluation; and storing said improved enhancement gain to gain memory.

6. The method of claim 5, wherein said global motion evaluation of a frame to determine said K factor comprises the steps of:

calculating an absolute value of the difference between the current frame and a previous frame pixel by pixel;

comparing said absolute value with a predetermined threshold value;

counting a number of absolute values which are greater than said threshold value; and evaluating global motion based on the equation:

$$\text{motion\_global} = \text{count\_over}/\text{count\_num},$$

wherein motion_global is used as the K factor, count_over is a number of absolute values greater than said threshold, and count_num is a total number of differences calculated.

7. A method of improving temporal consistency of an enhanced signal representative of at least one frame using a sharpness enhancement algorithm with an enhancement gain, said method comprising the steps of:

receiving the enhanced signal including at least one frame;

obtaining an enhancement gain associated with the sharpness enhancement algorithm for each pixel in the frame;

calculating an improved enhancement gain of a pixel in a frame by applying a motion adaptive temporal IIR filter on said enhancement gain, said improved enhancement gain is determined by the equation:

$$\text{gain\_final} = K * \text{gain\_SEA} + (1-K) * \text{gain\_prev},$$

wherein gain_final is the improved enhancement gain to use in said sharpness enhancement algorithm, gain_SEA is the enhancement gain previously defined in said sharpness enhancement algorithm, gain_prev is an enhancement gain of a pixel at the same location in the previous frame, and K is a factor calculated based on global motion evaluation;

storing said improved enhancement gain to gain memory; and applying the improved enhancement gain to said sharpness enhancement algorithm to improve temporal consistency of said enhanced signal.

8. The method of claim 7, wherein said global motion evaluation of a frame to determine said K factor comprises the steps of:

calculating an absolute value of the difference between the current frame and a previous frame pixel by pixel;

comparing said absolute value with a predetermined threshold value;

counting a number of absolute values which are greater than said threshold value; and evaluating global motion based on the equation:

$$motion\_global = count\_over/count\_num,$$

wherein motion_global is used as the K factor, count_over is a number of absolute values greater than said threshold, and count_num is a total number of differences calculated.

9. A system for improving temporal consistency of an enhanced signal representative of at least one frame using a sharpness enhancement algorithm with an enhancement gain, said system comprising:

means for receiving the enhanced signal including at least one frame;

means for obtaining an enhancement gain associated with the sharpness enhancement algorithm for each pixel in the frame;

means for calculating an improved enhancement gain of a pixel in a frame by applying a motion adaptive temporal IIR filter on said enhancement gain, said improved enhancement gain is determined by the equation:

$$gain\_final = K*gain\_SEA + (1-K)*gain\_prev,$$

wherein gain_final is the improved enhancement gain to use in said sharpness enhancement algorithm, gain_SEA is the enhancement gain previously defined in said sharpness enhancement algorithm, gain_prev is an enhancement gain of a pixel at the same location in the previous frame, and K is a factor calculated using global motion evaluation means;

means for storing said improved enhancement gain to gain memory; and means for applying the improved enhancement gain to said sharpness enhancement algorithm to improve temporal consistency of said enhanced signal.

10. The system of claim 9, wherein said global motion evaluation means for determining said K factor comprises:

means for calculating an absolute value of the difference between the current frame and a previous frame pixel by pixel;

means for comparing said absolute value with a predetermined threshold value;

means for counting a number of absolute values which are greater than said threshold value;

means for evaluating global motion based on the equation:

$$motion\_global = count\_over/count\_num,$$

wherein motion_global is used as the K factor, count_over is a number of absolute values greater than said threshold, and count_num is a total number of differences calculated.

11. A system for improving temporal consistency of an enhanced signal representative of at least one frame using a sharpness enhancement algorithm with an enhancement gain, said system comprising:

means for receiving the enhanced signal including at least one frame;

means for obtaining an enhancement gain associated with the sharpness enhancement algorithm for each pixel in the frame;

means for retrieving an enhancement gain value of each pixel from a reference frame in a gain memory based on motion vectors;

means for identifying if the frame is an I, P or B frame type;

means for determining an updated enhancement gain for an I frame type by calculating a gain map for use in the sharpness enhancement algorithm, wherein the updated enhancement gain of each pixel is equal to enhancement gain previously determined for use in the sharpness enhancement algorithm;

means for determining an updated enhancement gain for a P or B frame type according to the equation:

$$gain\_update = \alpha*gainSEA + (1-\alpha)*gainREF$$

wherein gain_update is the updated enhancement gain to use in said sharpness enhancement algorithm, gainSEA is the enhancement gain previously defined in said sharpness enhancement algorithm, gainREF is the enhancement gain value of a reference pixel pointed by a motion vector in said reference frame, and $\alpha$ is a coefficient in the range between 0 and 1;

means for storing said updated enhancement gain to gain memory.

12. The system of claim 11, further comprising:

means for calculating an improved enhancement gain of a pixel in a frame by applying a motion adaptive temporal IIR filter on said updated enhancement gain, said improved enhancement gain is determined by the equation:

$$gain\_final = K*gain\_update + (1-K)*gain\_prev,$$

wherein gain_final is the improved enhancement gain to use in said sharpness enhancement algorithm, gain_update is the updated enhancement gain previously calculated for said sharpness enhancement algorithm, gain_prev is an enhancement gain of a pixel at the same location in the previous frame, and K is a factor calculated using global motion evaluation means;

means for storing said improved enhancement gain to gain memory; and means for applying the improved enhancement gain to said sharpness enhancement algorithm to improve temporal consistency of said enhanced signal.

13. The system of claim 12, wherein said global motion evaluation means for determining said K factor comprises:

means for calculating an absolute value of the difference between the current frame and a previous frame pixel by pixel;

means for comparing said absolute value with a predetermined threshold value;

means for counting a number of absolute values which are greater than said threshold value;

means for evaluating global motion based on the equation:

motion_global=count_over/count_num, wherein motion_global is used as the K factor, count_over is a number of absolute values greater than said threshold, and count_num is a total number of differences calculated.